United States Patent Office 2,934,520
Patented Apr. 26, 1960

---

2,934,520

EPOXY RESIN COMPOSITIONS

George Mayurnik, Garfield, N.J., assignor to Aries Laboratories, Inc., New York, N.Y., a corporation of New York No Drawing. Application October 4, 1954
Serial No. 460,247

6 Claims. (Cl. 260—47)

This invention relates to novel compositions of matter resulting from the interaction of epoxy and hydroxy containing ethers with mixtures of polycarboxylic acid anhydrides. The components which react to produce hard infusible resins may be incorporated in varnish, coating, molding, and casting compositions to produce resins of improved chemical, mechanical, and thermal properties. More specifically, the starting materials are ethers of polyhydric phenols carrying epoxy groups in the ether side chains and they may be prepared in known manner by reacting the polyhydric phenol with epihalohydrins or polyepoxides.

An object of this invention is the preparation of resins which will cure at relatively low temperatures.

Another object of this invention is the preparation of new resin compositions which are suitable for casting and molding.

Another object of this invention is the preparation of novel compositions which will cure to infusible resins at relatively low temperatures and which after curing are characterized by their inertness, low volumetric change, and resistance to attack by most chemicals.

Another object of this invention is the preparation of a single composition which can be used for preparing the aforementioned resins with no additional promoters or hardeners, requiring at most the addition of heat.

Other objects will become apparent from the description of the invention which follows.

According to the present invention a mixture of polycarboxylic acid anhydrides is reacted with an epoxy compound whereby a hard infusible resin results through cross-linking. The epoxide may be considered an ether of a polyhydric phenol and an alcohol containing an epoxy group and it may be prepared by reacting the polyhydric phenol with an excess of an epihalohydrin in the presence of an alkaline catalyst. Insofar as the active functions of this reaction are concerned, the reaction is the conventional etherification wherein hydrogen halide is split out. The polyhydric phenol used in preparation of the ether may be a mononuclear compound possessing two or more nuclear hydroxyl groups such as resorcinol, hydroquinone, catechol, and the like. Polynuclear phenols may similarly be employed and among these are the polyhydroxy derivatives of diphenyls, diphenyl methanes, naphthalenes, and polynaphthalenes, such as 4,4'-dihydroxy-diphenyl methane, 4,4'-dihydroxy-diphenyl dimethyl methane, 4,4'-dihydroxydiphenyl, 1,5-dihydroxy naphthalene, and the like.

In the presence of a strongly alkaline medium the reaction of the epihalohydrin with the polyhydric phenol can be represented as follows:

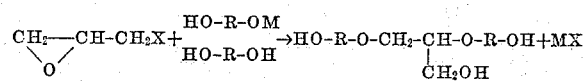

The further addition of epihalohydrin will first lead to reaction with the two phenolic hydroxyl groups producing two terminal epoxy groups. Branching also occurs as a consequence of reaction of the epihalohydrin with the primary alcohol group and molecules having the following general configuration are probable:

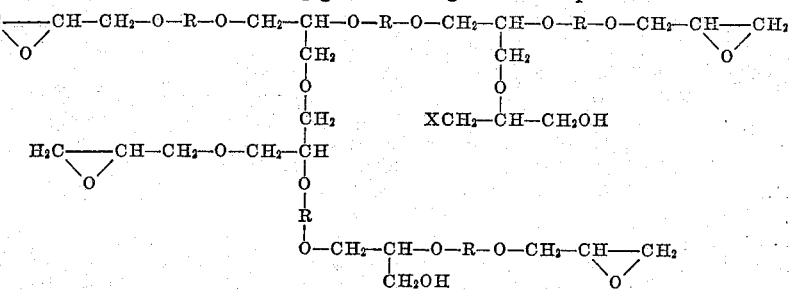

wherein R represents the residue of a dihydric phenol apart from the hydroxyl groups, wherein X represents a halogen atom, and wherein M represents an alkali metal.

The condensation indicated can be continued to the stage where the intermediate product to be used as starting material in the practice of the invention becomes a brittle solid. This occurs at a molecular weight of about 2000 but the molecular weight of the intermediate can be regulated by varying the proportions of the reagents. A preferred range covers from about 1.5 to about 5 moles of the epoxy etherifying agent per mole of polyhydric phenol and the products resulting therefrom vary from viscous liquids to low melting solids.

This preparation of the intermediate is known in the art and many variations may be made in the reagents, the reaction conditions, and the catalysts. As indicated, various polyhydric phenols may be employed with similar results. In place of epichlorhydrin, which is the preferred etherifying agent, other epihalohydrins such as the iodides and bromides may be employed or even diepoxides such as butadiene diepoxide, 2-methyl butadiene diepoxide, cyclopentadiene diepoxide, cyclohexadiene diepoxide, and the like. The modifications necessary in processes employing different etherifying agents are apparent and well known. The catalyst is preferably alcoholic potassium hydroxide but other alkaline materials both organic and inorganic may be utilized. Inexpensive materials such as caustic soda are quite suitable.

The following example is illustrative of the preparation of the starting material for the novel resin compositions of this invention:

Example I

Fifty-seven grams of 4,4'-dihydroxy-diphenyl dimethyl methane are added to two hundred and fifty milliliters of a 10% alcoholic potassium hydroxide solution (30 grams of KOH, 100 cc. of $C_2H_5OH$, and 150 cc. of water), and the mixture was heated at 55–65° C. for one-half hour in order to form the potassium salt of the phenolic compound. Ninety-three grams of epichlorhydrin are next added to the alcoholic solution over a one hour period, while the temperature is maintained between 75–90° C. A pale, taffy-like material begins to separate from the solution after addition of from 10 to 15 grams of the epichlorhydrin. After all the epichlorhydrin has been added, the taffy-like material is separated from the hot solution by decanting. This residue is washed three times with boiling water; it is washed once with cold water whereupon a white solid precipitate forms. Dissolution in hot acetone leaves behind the remainder of the potassium chloride. Evaporation of the acetone on a steam bath produces a clear amber solid melting from 85–90° C. The molecular weight as determined in boiling benzene ranges from 2000 to 2800.

The polycarboxylic acid anhydride used in the reaction cross-links the several chains of the intermediate resin by esterification with the hydroxy groups of the intermediate epoxy composition; the carboxyl groups thus formed react with an epoxy group, restoring hydroxyl groups. In addition to this heterogeneous condensation there is condensation between epoxy groups directly resulting in additional ether linkages. This cross-linking prevents the essentially linear molecules from slipping past each other, a physical property of a fluid, and fixes their dimensional relationship, characteristic of a solid.

Such cross-linking has been effected in the past with single polycarboxylic acid anhydrides. Among the anhydrides which have been used are those of saturated acids such as succinic and adipic acids, of unsaturated acids such as maleic and hydrogenated phthalic acids, and of aromatic acids such as phthalic acid. Diels-Alder adducts of unsaturated polycarboxylic acid anhydrides and dienes such as butadiene and the terpene hydrocarbons are also operative. Linear chains of polymerized adipic and sebacic acid anhydrides have also been used.

It has now been found that the use of mixtures of such anhydrides as cross-linking agents results in a marked improvement in the properties of the final product. Cast articles made from such resins are less brittle and more impervious to water and air as evidenced by reduced oxidation of electrical elements embedded therein. In addition, the resins are less affected by prolonged heating and changes in temperature. This latter property is most important in embedding electrical circuits in the resin since oftentimes the heat generated by the element itself results in failure of the resin which is the sole insulation. Shortcomings of this nature have limited the use of the prior art resins.

Particularly suitable mixtures for the practice of this invention are equimolar mixtures of adipic and succinic acid anhydrides, adipic and phthalic acid anhydrides, adipic and sebacic acid anhydrides, and of maleic and phthalic acid anhydrides. Mixtures of polymerized adipic and sebacic acid anhydrides have been found quite useful. In place of a mixture of polymeric acid anhydrides, a copolymer of a mixture of anhydrides can be employed. While the mixture of anhydrides is generally employed in an amount sufficient to react with all the epoxy groups, i.e., one equivalent of carboxylic acid anhydride for each epoxy group, variations are possible with corresponding variations in properties. Decreased cross-linking will result in greater resistance to breakage under sudden impact but increased tendency to deform under a constant load. The specific proportions may therefore be varied in accordance with the requirements and uses of the final resin. The proportions of each component of the mixture of acid anhydrides may likewise be varied within wide limits depending on the properties desired in the product.

In all cases, however, it has been found that resins resulting from the use of a mixture of acid anhydrides are superior to those prepared from single anhydrides. While it would be expected that a mixture of acid anhydrides would result in a proportionate average of the properties when using each component separately, it has unexpectedly been found that this is not the case. Without intentions of being bound thereby, it is offered as a theoretical explanation that epoxy groups which would be too close or too far apart to be linked by a single reagent may nonetheless be linked by the other acid anhydride. As the cross-linking ensues, the epoxy groups become relatively frozen in position and there is decreased opportunity to contact a function of a polycarboxylic acid of a given length secured at one end to another group. The difference in the lengths of the cross-linking polycarboxylic acid molecules when employing a mixture of acid anhydrides increases the likelihood of cross-linking for a given molar equivalent of anhydride. Therefore the reaction is more complete, all other factors being the same.

In addition, each of the cross-linking agents complements and re-enforces the other. As a mechanical equivalent, one can consider a plurality of rigid parallel chains, the links of a given chain being connected to the links of the other chains by springs of varying lengths in order to maintain the dimensional stability of the entire structure. The longer springs therefore protect the shorter against inelastic deformation under tension and the shorter cushion the effects of compression. This theoretical explanation is offered in retrospect in an effort to explain the physical properties actually observed.

The following examples are furnished as illustrations of the preparation of some of the resins of this invention but are not intended as limitations:

*Example II*

One hundred grams of the resin intermediate prepared in Example I are melted and 28 grams of an equimolar mixture of adipic and succinic acid anhydrides are stirred in until a homogeneous mixture results. The temperature of the melt is then raised to 125° C. and maintained for 8 to 12 hours. A solid mass results which after slow cooling is found to exhibit excellent mechanical, thermal, and electrical properties.

*Example III*

The procedure of Example II is repeated using 28 grams of a 2:1 molar mixture of the anhydrides of adipic and phthalic acids. The solid resin has properties similar to those of the product of Example II.

*Example IV*

Thirty grams of a 2:3 molar mixture of adipic and sebacic acid anhydrides are stirred into 100 grams of the molten resin intermediate prepared in Example I. The reaction is allowed to proceed as previously to the formation of a solid product. The reaction is not attended by any change in volume or by the liberation of any liquid or gas.

*Example V*

One hundred grams of the resin intermediate prepared in Example I are melted at 125–130° C. and a mixture of 10 grams of maleic acid anhydride (.10 mole) and 20 grams of phthalic acid anhydride (.14 mole) is added with stirring. The polymerization is carried out by heating for 16 hours at 125° C.

*Example VI*

The procedure of Example V is repeated using a mixture of 10 grams of polymeric adipic acid anhydride (.08 mole) and 20 grams of phthalic acid anhydride (.14 mole).

When subjected to standard impact tests the resin made from polymeric adipic acid anhydride and phthalic acid anhydride in admixture exhibited an impact strength more than 10% greater than a resin from polymeric adipic acid anhydride alone, and more than 60% greater than a resin from phthalic acid anhydride alone. The test specimens were prepared with equal weights of anhydride but since the molecular weights are close, the same superior properties are obtained whether calculated on a weight or molar basis.

*Example VII*

A mixture of 10 grams of polymeric sebacic acid anhydride (.06 mole) and 20 grams of phthalic acid anhydride (.14 mole) are added to one hundred grams of the intermediate resin. The reaction mass is maintained at 125° C. for 16 hours resulting in the formation of a resin which is particularly shock resistant.

*Example VIII*

To one hundred grams of the resin intermediate of Example I, a mixture of 15 grams of polymeric adipic acid anhydride and 15 grams of monomeric sebacic acid anhydride is added with stirring. The final resin is prepared by maintaining the temperature of the mixture at 125° C. for sixteen hours.

Various other mixtures of anhydrides may be employed in the practice of the invention with generally similar results. The individual anhydrides comprising the mixture may be present as monomers or as polymers of different chain lengths. The higher dibasic acids on dehydration are known to form long chain polymers of varying molecular weights and in some instances these forms are more stable than a monomeric or dimeric anhydride molecule, particularly with adipic and sebacic acid anhydrides.

In commerce, the ingredients may each be packaged and shipped separately or they may be packaged separately within a single container in the requisite proportions for the particular application. As an alternative, the components may be mixed before packaging and if care is exercised to prevent overheating the components will not interact prematurely. In those instances where the anhydrides are relatively high melting solids this latter method of packaging is preferred. Since the anhydrides tend to be somewhat deliquescent, if combined with the intermediate epoxy resin the anhydride particles will become coated with epoxy resin particles preventing the further adsorption of water.

Various changes and modifications may be made without departing from the spirit and scope of this invention, and it is intended that such obvious changes and modifications be construed as within the scope of the annexed claims.

I claim:

1. The heat condensation product of a resinous glycidyl polyether of a polyhydric phenol which ether is free from functional groups other than epoxy and hydroxy groups, and an amount sufficient to react with all the epoxy groups present of a mixture of two dicarboxylic anhydrides selected from the group of mixtures consisting of monomeric adipic and succinic, monomeric adipic and phthalic, monomeric adipic and sebacic, polymeric adipic and monomeric phthalic, polymeric sebacic and monomeric phthalic, and polymeric adipic and monomeric sebacic anhydrides, the molar proportion of the dicarboxylic anhydrides in said mixture ranging from about 1:1 to 1:2.

2. The heat condensation product of a resinous glycidyl ether of a polyhydric phenol which ether is free from functional groups other than epoxy and hydroxy groups, and an amount sufficient to react with all the epoxy groups present of a mixture of polymeric sebacic acid anhydride and of phthalic anhydride, the phthalic anhydride being present in said mixture in approximately twice the molar amount of the sebacic anhydride.

3. A composition of matter capable of setting to an infusible resin upon the application of heat comprising about 100 parts by weight of a resinous glycidyl ether of a polyhydric phenol which ether is free from functional groups other than epoxy and hydroxy groups, and from about 28 to about 30 parts by weight of a mixture of two dicarboxylic anhydrides selected from the group of mixtures consisting of monomeric adipic and succinic, monomeric adipic and phthalic, monomeric adipic and sebacic, polymeric adipic and monomeric phthalic, polymeric sebacic and monomeric phthalic, and polymeric adipic and monomeric sebacic anhydrides, the molar proportion of the dicarboxylic anhydrides in said mixture ranging from about 1:1 to 1:2.

4. The composition of claim 3 in which the ether is a polymeric glycidyl ether of 4,4'-dihydroxydiphenyl dimethyl methane.

5. The heat condensation product of a resinous glycidyl ether of a polyhydric phenol which ether is free from functional groups other than epoxy and hydroxy groups, and an amount sufficient to react with all the epoxy groups present of a mixture of polymeric adipic and monomeric sebacic anhydrides, the molar ratio of adipic anhydride to sebacic anhydride in said mixture being about 1:1.

6. The product of claim 5 in which the ether is a polymeric glycidyl ether of 4,4'-dihydroxydiphenyl dimethylmethane.

References Cited in the file of this patent

UNITED STATES PATENTS

| | | |
|---|---|---|
| 2,324,483 | Castan | July 20, 1943 |
| 2,712,535 | Fisch | July 5, 1955 |
| 2,720,500 | Cody | Oct. 11, 1955 |
| 2,768,153 | Shokal | Oct. 23, 1956 |

FOREIGN PATENTS

| | | |
|---|---|---|
| 511,733 | Belgium | Nov. 29, 1952 |
| 133,819 | Australia | Aug. 10, 1949 |